United States Patent [19]
Nakayama et al.

[11] Patent Number: 5,328,740
[45] Date of Patent: Jul. 12, 1994

[54] MAGNETO-OPTICAL RECORDING MEDIUM AND METHOD FOR PROCESSING THE SURFACE

[75] Inventors: Junichiro Nakayama, Nara; Yoshiteru Murakami, Nishinomiya; Hiroyuki Katayama, Nara; Kenji Ohta, Kitakatsuragi, all of Japan

[73] Assignee: Sharp Kabushiki Kaisha, Osaka, Japan

[21] Appl. No.: 650,283

[22] Filed: Feb. 4, 1991

[30] Foreign Application Priority Data

Feb. 6, 1990 [JP] Japan .................................. 2-26477

[51] Int. Cl.⁵ .................... B32B 3/02; B32B 3/10; G11B 5/66
[52] U.S. Cl. ........................... 428/64; 428/141; 428/694 ML; 428/694 DE; 428/694 TR; 428/694 SG; 360/135; 369/277; 369/280
[58] Field of Search ............... 428/64, 141, 694, 900, 428/694 ML, 694 DE, 694 TR, 694 SG; 360/135; 369/277, 280

[56] References Cited

U.S. PATENT DOCUMENTS

| | | | |
|---|---|---|---|
| 4,443,294 | 4/1984 | Suenaga et al. | 156/656 |
| 4,698,251 | 10/1987 | Fukuda et al. | 428/64 |
| 4,707,431 | 11/1987 | Umehara | 430/271 |
| 4,729,938 | 3/1988 | Tajima et al. | 430/272 |
| 4,737,877 | 4/1988 | Krongelb et al. | 360/135 |
| 4,861,699 | 8/1989 | Wijdenes et al. | 430/321 |
| 4,917,970 | 4/1990 | Funkenbusch | 428/694 |
| 4,940,618 | 7/1990 | Hamada et al. | 428/64 |
| 5,068,841 | 11/1991 | Nakayama et al. | 369/13 |
| 5,080,948 | 1/1992 | Morita et al. | 428/64 |

FOREIGN PATENT DOCUMENTS

| | | |
|---|---|---|
| 3629582 | 3/1988 | Fed. Rep. of Germany . |
| 62-262227 | 11/1987 | Japan . |
| 63-034723 | 2/1988 | Japan . |

OTHER PUBLICATIONS

N. Tsuya et al. IE ICE Technical Report vol. 88, No. 344.
Sukeda et al., "High Speed Magnetic Film Modulation Magneto-Optical Disk Drive", *Hitachi Central Research Lab.* MR89-56, pp. 79-85.
Narumi et al., "Study of Protective Layer for Magnetic Field Modulation Recording Media in Magneto-Optical Disks", Fujitsu Laboratories, Atsugi, 23 pc-5, (1989), p. 204.
T. Yeh et al., "Sliding Damage and Stress State of Multilayer Thin Film Rigid Media", Journal of the Magnetics Socity of Japan, vol. 13, Supp. No. S1 (1989) pp. 163-168.
H. Kondo et al., "Novel Lubricants for Magnetic Thin Film Media", Journal of Magnetics Society of Japan, (List continued on next page.)

*Primary Examiner*—Paul J. Thibodeau
*Assistant Examiner*—Leszek Kiliman
*Attorney, Agent, or Firm*—David G. Conlin; George W. Neuner

[57] ABSTRACT

A surface of a magneto-optical recording medium of the present invention is textured with fine and physical protrusions and recessions. The shapes of physical protrusions and recessions vary at each radial locations on the medium such that, for example, rough protrusions and recessions are formed in inner parts of the recording medium and fine protrusions and recessions are formed in outer parts thereof. Therefore, floating force given to a floating head from the medium being rotated based on the constant angular velocity method through an air layer in the outer parts equals floating force in the inner parts. Consequently, since the floating height of the floating head becomes constant irrespective of radial locations on the medium, information can be recorded under constant recording conditions, permitting the accuracy of the recording to improve. Regarding a method for processing the surface of a magneto-optical recording medium relating to the present invention, for example, a texture tape whose roughness is large is used in inner parts of the medium while a texture tape whose roughness is small is used in outer parts thereof. As a result, a magneto-optical recording medium having the above characteristics is produced.

4 Claims, 4 Drawing Sheets

OTHER PUBLICATIONS vol. 13, Supp. No. S1 (1989) pp. 213–218 U.S. Patent Appln. Serial No. 07/584,713, filed Sep. 19, 1990.
Richter, J. "Polishing and Texturing Nickel Coated Aluminum Substrates" (English Abstract of Reference AA).
Bhushan, B. "Crash Prevention For Magnetic Storage Devices" *Mechanical Engineering* Jan. 1989 pp. 80–84.
A Paper Presented at the 34th Meeting of the Toyama Prefecture of the Japan Lubrication Society in 1989 (with English Abstract thereof).

FIG.10(a)
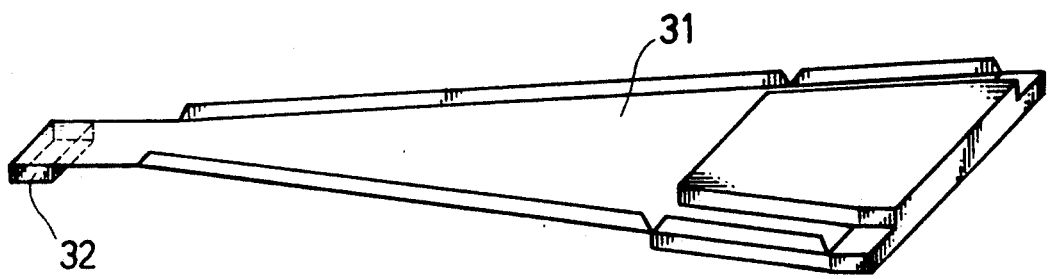
FIG.10(b)
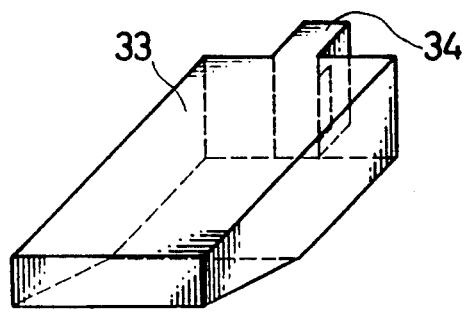
FIG.11(a)              FIG.11(b)           FIG.12
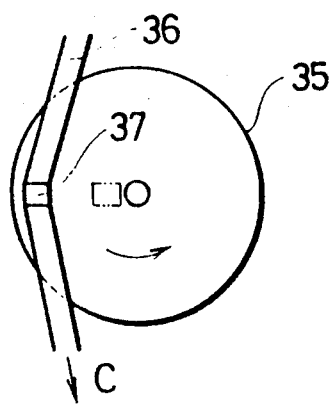 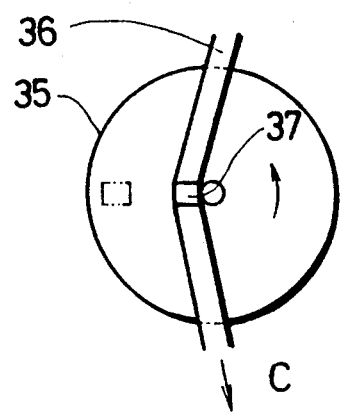 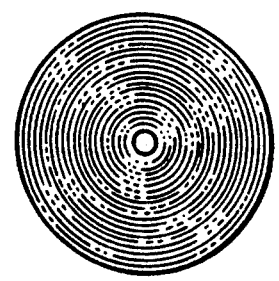

MAGNETO-OPTICAL RECORDING MEDIUM AND METHOD FOR PROCESSING THE SURFACE

FIELD OF THE INVENTION

The present invention relates to a magneto-optical recording medium to be used with a magneto-optical recording/reproducing device comprising a floating type magnetic head, and to a method for processing the surface of the magneto-optical recording medium.

BACKGROUND OF THE INVENTION

In the magneto-optical recording method, a substrate made of glass, plastic, ceramic or other material and coated with a vertically magnetized film composed of metal magnetic material serves as a recording medium, and recording and reproducing operations on and from the recording medium are carried out in the following process.

In the recording operation, first the magnetization direction of the vertically magnetized film of the recording medium is arranged to a predetermined direction (upward direction or downward direction) by using a strong external magnetic field or the like (hereinafter this process is referred to as initialization). Then the temperature of a recording portion where the recording is to be carried out is raised to exceed the vicinity of the Curie point or is raised to exceed its magnetic compensation point by projecting a laser beam on the recording portion. As a result, the magnetic coercive force (Hc) on the recording portion becomes zero or substantially zero. With this state, the magnetization direction is reversed by applying an external magnetic field (bias magnetic field) whose magnetization direction is opposite to the initialized magnetization direction. When the projection of the laser beam is stopped, the recording portion of the recording medium returns to room temperature. Thus, since the reversed magnetization direction is fixed, information is recorded. The above-mentioned recording operation is also called thermomagnetic recording.

In the reproducing operation, a linearly polarized laser beam is projected onto the recording medium. The rotating direction of a polarization plane of reflected light or transmitted light from or through the recording medium varies according to the magnetization direction (upward or downward) of the recording medium (this is called magnetic Kerr effect or magnetic Faraday effect). Information is optically read out by the use of the magnetic effect.

Recording media used in the magneto-optical recording method have been noted as large capacity memory elements of a re-writable type. At present, there are two methods for re-writing over the information recorded on the recording medium, described in (i) and (ii) below.

(i) A method wherein the previously recorded information is deleted by initializing the recording medium again.

(ii) A method wherein a recording medium or an external magnetic field generating device is improved so that overwriting is performed, i.e. the information is re-written directly without performing the deletion.

If method (i) is adopted, either an initialization device or two heads must be installed, thereby causing a rise in cost. Moreover, in case of deleting information with a single head, the same time taken for recording is required for deleting, resulting in the inefficient operation of re-writing information.

In the mean time, if method (ii), improving the recording medium, is adopted, it is difficult to control recording medium composition, film thickness and so on. For the above reasons, the most effective means is improving the external magnetic field generating device of method (ii), i.e. switching a direction of the external magnetic field at high speed according to information signals while keeping the intensity of the laser beam constant.

In order to switch the direction of the external magnetic field at high speed, a magnetic head (a coil and a coil core) of the external magnetic field generating device must be miniaturized to a great degree. In this case, however, a generating area of the magnetic field becomes smaller. In order to counteract this, a magnetic head and a recording medium must be brought closer to each other. Thus, as shown in FIG. 10($a$) and FIG. 10($b$), generally a floating head 32 of a sliding type which can glide over a recording medium in the shape of a disc (not shown) is employed as the external magnetic field generating device. The floating head 32 comprises a slider section 33 provided with a magnetic head section 34. The floating head 32 is pressed down toward the recording medium and supported by a suspension 31. According to the configuration, when the recording medium is rotated, the floating head 32 floats over the surface of the recording medium.

A constant floating height of the floating head 32 is maintained due to the fact that floating force balances with depressing force. The floating force is exerted upwards on the slider section 33 by the air flowing between the slider section 33 and the recording medium. The depressing force is exerted downwards on the slider section 33 by the suspension 31. The floating head of this type is also used for conventional hard disks of magnetic recording/reproducing devices. In the case of the hard disks, the floating height is of a submicron order. However, when the recording medium is a magneto-optical disk, a floating height of 5 $\mu$m to 15 $\mu$m is necessary, i.e. a larger floating height is needed for the magneto-optical disk than for the hard disk. The reasons for this are as follows. Since the magneto-optical disks are transportable, dust tends to stick more frequently on the disk. As a result, troubles such as a head crash, where the magneto-optical head 34 is damaged by dust as the floating height is too small, may occur.

A surface of the magneto-optical disk which faces the floating head 32, is textured with fine and physical protrusions and recessions, preventing the surface of the disk from sticking to the floating head. As shown in FIG. 11($a$) and FIG. 11($b$), when forming the disk surface with the texture, a texture tape 36 having fine protrusions and recessions on the surface thereof is used. More precisely, when forming the disk surface with the texture, the texture tape 36 is pressed onto a magneto-optical disk 35 by a tape pressure roller 37 and then the magneto-optical disk 35 is rotated while feeding the texture tape in the direction of arrow C. In this case, since the rotating direction of the magneto-optical disk 35 is in parallel with the feeding direction of the tape 36, the protrusions and recessions are evenly formed on the magneto-optical disk 35 as shown by the two-dot long and two short dashes line of FIG. 12, substantially forming concentric circles.

As aforesaid, in the case of the magneto-optical disk, the floating height of the floating head is 5 μm to 15 μm, greater than a floating height required when a hard disk is used. Therefore, variations in the floating height greatly depend on the relative velocity between the magneto-optical disk and the floating head. The relation is shown in Table 1 below. Referring to Table 1, if depressing force F of the suspension is constant and the relative velocity increases by two times, the floating height increases by a substantial one and half times (here, the dimensions of the slider section are 6 mm×4 mm). Thus, in case the magneto-optical disk is rotated based on the Constant Angular Velocity method (hereinafter referred to as CAV method), the relative velocity is higher in outer parts of the magneto-optical disk than in inner parts thereof, resulting in a higher floating height in the outer parts. Consequently, a magnetic field intensity applied to the magneto-optical disk by the floating head varies at each radial locations on the magneto-optical disk, and therefore a problem arises, i.e. the recording operation with a conventional magneto-optical disk cannot be carried out under constant conditions.

TABLE 1

(the relation between the relative velocity and the floating height)

| F | V | |
|---|---|---|
| | 10 m/s | 20 m/s |
| 5 gf | 6.5 μm | 10 μm |
| 10 gf | 4 μm | 6.5 μm |

Where,
F: depressing force due to the suspension
V: head-medium relative velocity

SUMMARY OF THE INVENTION

It is an object of the present invention to provide a magneto-optical recording medium in the shape of disc and to provide a method for processing the surface of the magneto-optical disk. When the magneto-optical disk is used with a floating type magnetic head (hereinafter referred to as a floating head) and is rotated based on the CAV method, a constant floating height of the floating head is maintained irrespective of radial locations on the magneto-optical disk.

In order to achieve the above object, a magneto-optical recording medium of the present invention is characterized in that the shapes of fine and physical protrusions and recessions formed on the surface of the magneto-optical recording medium vary at each radial locations on the magneto-optical recording medium.

For example, in case physical protrusions and recessions whose respective length are longer than their respective widths are formed, the average orientation of the respective protrusions and recessions with respect to their lengths crosses the rotating direction of the recording medium at substantially right angle in inner parts of the recording medium and is substantially in parallel with the rotating direction in outer parts thereof.

As for another example, the physical protrusions and recessions are formed such that the maximum value $R_{MAX}$ of their heights is larger in the inner parts than in the outer parts, i.e. rough protrusions and recessions are formed in the inner parts while fine protrusions and recessions are formed in the outer parts.

Further, in order to achieve the object, a method for processing the surface of a magneto-optical recording medium relating to the present invention may be adopted, wherein a tape having a surface whereon fine and physical protrusions and recessions are formed is used. In this method, fine and physical protrusions and recessions to be formed on the surface of the recording medium by pressing the tape onto the recording medium with pressure means and moving the pressure means, are respectively aligned in a direction which crosses the rotating direction of a recording medium at substantially right angle in the inner parts and is in parallel with the rotating direction of the medium in the outer parts.

Another method for processing the surface of a magneto-optical recording medium relating to the present invention is characterized in that a tape whose roughness is large is used in the inner parts of the recording medium and a tape whose roughness is small is used in the outer parts thereof so as to form rough protrusions and recessions in the inner parts and fine protrusions and recessions in the outer parts. Instead of using tapes having different conditions each other in roughness, the depressing force of the pressure means may be strengthened in the inner parts while it may be weakened in the outer parts.

Another method for processing the surface of a magneto-optical recording medium is characterized in that by using a stamper whereon fine and physical protrusions and recessions corresponding to desired shapes to be formed on the recording medium are etched, the protrusions and recessions of the desired shapes are copied on the surface of the recording medium.

Regarding a magneto-optical recording medium processed based on the above methods, the shape of protrusions and recessions formed on the surface of the recording medium varies from the inner parts of the recording medium toward the outer parts thereof. For example, in case the average orientation of the physical protrusions and recessions formed on the surface of the recording medium with respect to their lengths crosses the rotating direction of the recording medium at substantially right angle in the inner parts, force (hereinafter referred to as floating force) given to a floating head from the recording medium being rotated in the CAV method through an air layer is taken into consideration. In this case, floating force in the inner parts where the relative velocity between the recording medium and the floating head is small equals floating force in the outer parts where the relative velocity is large. Moreover, for instance, if the heights of the protrusions and recessions are higher in the inner parts than in the outer parts, the floating force in the inner parts becomes equal to the floating force in the outer parts. Therefore, even when the relative velocity between the floating head and the recording medium changes due to the rotation of the magneto-optical recording medium in the CAV method, the floating height of the floating head does not vary. As a result, the recording condition is maintained to be constant irrespective of the locations on the recording medium in a radial direction, thereby permitting the accuracy of the recording to improve.

The method using a stamper can be adopted for the mass production of magneto-optical recording media having the above-mentioned characteristics.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 3 show one embodiment of the present invention.

FIG. 1 is a schematic longitudinal sectional view showing the structure of a magneto-optical disk.

FIG. 2 is a typical plan depiction showing the features of the texture of the magneto-optical disk surface.

FIG. 4 is a schematic longitudinal sectional view showing the structure of a magneto-optical disk.

FIG. 5 is a typical schematic plan depiction showing the features of textures of the magneto-optical disk surface.

FIG. 6 to FIG. 9 show another embodiment of the present invention.

FIG. 6 is a typical schematic perspective depiction showing the features of the texture of a magneto-optical disk surface.

FIG. 8 and FIG. 9 are schematic perspective views showing a method for mass-producing the texture by the use of stampers.

FIG. 10(a) is a schematic perspective view showing a floating head and a suspension.

FIG. 10(b) is a perspective view showing the floating head.

FIG. 11 and FIG. 12 show a conventional example.

FIG. 11(a) and FIG. 11(b) are explanatory views showing a method for forming a magneto-optical disk surface with a texture by using a texture tape.

FIG. 12 is a typical plan depiction showing the features of the texture of the magneto-optical disk surface.

DESCRIPTION OF THE EMBODIMENTS

The first embodiment of the present invention will be described below with reference to FIG. 1 to FIG. 3.

Figure 1:
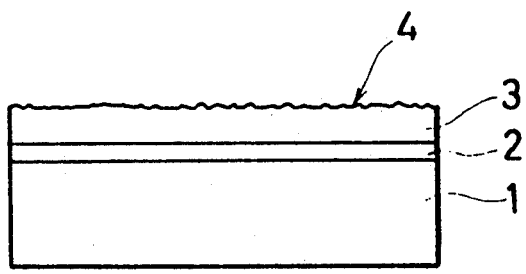
Figure 2:
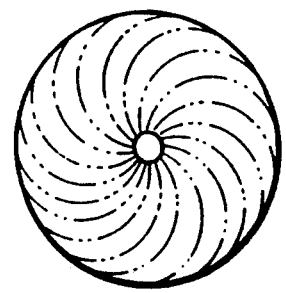

As shown in FIG. 1, a magneto-optical disk as a magneto-optical recording medium of the present invention is configured such that a substrate 1, a magneto-optical recording film 2 and a protective film 3 are laminated in order. The substrate 1 is made of an optically transparent material such as glass, polycarbonate, polymethyl methacrylate and amorphous polyolefine. The magneto-optical recording film 2 of single-layer structure or multilayer structure including a dielectric film, reflection film and the like, is formed on the substrate 1 by sputtering, evaporation or other process. Regarding the protective film 3 formed on the magneto-optical recording film 2, it is made of an organic material such as UV hardening resin or an inorganic material such as $SiO_2$, carbon and ceramic.

Fine and physical protrusions and recessions forming a texture 4 are formed on the surface of the protective film 3. The process for giving the texture 4 to the surface of a magneto-optical disk is called the surface processing. As shown by the two-dot long and two short dashes line of FIG. 2, for example, the protrusions and recessions forming the texture 4 are aligned in a direction which crosses the rotating direction of the disk at substantially right angle in inner parts of the disk, while they are aligned in a direction which is substantially in parallel with the rotating direction of the disk in outer parts thereof. In other words, in case fine and physical protrusions and recessions whose respective lengths are longer than their respective widths form the texture 4, the average orientation of the respective physical protrusions and recessions with respect to their lengths varies successively so that it crosses the rotating direction of the disk at substantially right angle in the inner parts of the disk and it is substantially in parallel with the rotating direction in the outer parts thereof. Briefly, the fine and physical protrusions and recessions are formed on the surface of the magneto-optical disk in different directions at respective radial locations. Accordingly, floating force given to a floating head from the magneto-optical disk being rotated based on the CAV method through an air layer becomes the same in both in the inner parts and in the outer parts. Consequently, the floating height of the floating head becomes constant irrespective of radial locations on the magneto-optical disk.

Next, a method for processing the disk surface is described below.

Figure 3A:
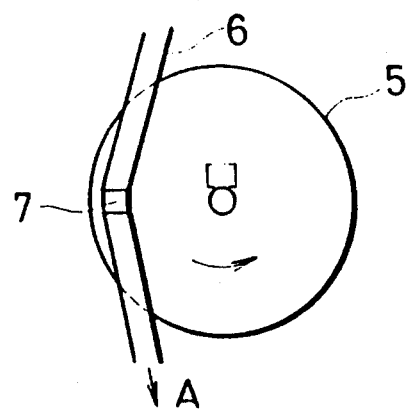
FIG. 3(a) and FIG. 3(b) are explanatory views showing a method for forming the recording medium surface with the texture.
Figure 3B:
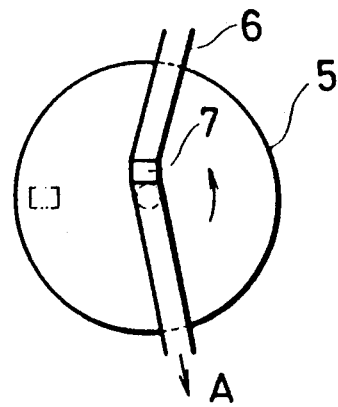

As shown in FIG. 3(a), a texture tape 6 having fine and physical protrusions and recessions on its surface is used for forming the texture 4. In case protrusions and recessions forming the texture 4 are formed in outer parts of a magneto-optical disk 5, the texture tape 6 is pressed onto the surface of the disk 5 by a pressure roller 7 as pressure means and then the texture tape 6 is fed to the direction of arrow A shown in FIG. 3(a) while rotating the disk 5. On the other hand, in case forming protrusions and recessions forming the texture 4 from the outer parts of the disk 5 toward the inner parts, the pressure roller 7 is moved toward the inner parts from the outer parts, i.e. toward the position of FIG. 3(b) from the position of FIG. 3(a). With this operation, since the rotating direction of the disk 5 crosses the feeding direction of the texture tape 6 shown by arrow A at substantially right angle in the inner parts, the protrusions and recessions forming the texture 4 are aligned in a direction shown by the two-dot long and two short dashes line of FIG. 2.

In the present embodiment, the protrusions and recessions forming the texture 4 are formed on the surface of the magneto-optical disk 5 in clockwise, but they may be formed in counterclockwise.

Figure 4:
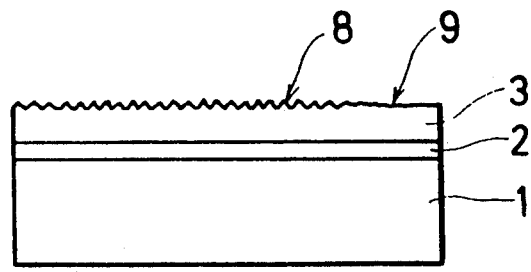
FIG. 4 and FIG. 5 show another embodiment of the present invention.
Figure 5:
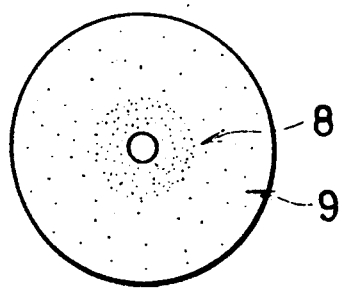

Referring to FIG. 4 and FIG. 5, the following description will discuss the second embodiment of the present invention. As to members whose functions are the same as the members shown in the drawings for the aforesaid embodiment, for convenience' sake, the same numbers are given thereto and the explanations are omitted here.

As shown in FIG. 4, similar to the above embodiment, a magneto-optical disk of the present embodiment comprises a substrate 1, a magneto-optical recording film 2 and a protective film 3. Protrusions and recessions forming textures 8 and 9 are formed on the surface of the protective film 3. As shown in FIG. 5, mainly rough protrusions and recessions forming the texture 8 are formed in inner parts of the disk, while mainly fine protrusions and recessions forming the texture 9 are formed in outer parts of the disk. The maximum value $R_{MAX}$ for the heights of the rough protrusions and recessions is 100 nm to 2500 nm, and the maximum value $R_{MAX}$ for the heights of the fine protrusions and recessions is not more than 200 nm. In FIG. 5, the area of the fine texture 9 and the area of the rough texture 8 are indicated distinguishably so that the features of the disk surface are easily understood. However, the protrusions and recessions can be formed such that each of the protrusions and recessions becomes smaller gradually from the inner parts toward the outer parts of the disk according to the relative velocity between the magneto-optical disk and the floating head. As described above, the shapes of the fine and physical protrusions and recessions formed on the surface of the protective film 3 vary at each radial locations on the disk. As a result, since floating force given to the floating head from the magneto-optical disk being rotated in the CAV method through an air layer is the same in both in the inner parts and in the outer parts, the floating height of the floating head becomes constant irrespective of radial locations on the magneto-optical disk.

For performing the above-mentioned surface processing in the inner parts of the magneto-optical disk, a texture tape of a large roughness is pressed onto the inner parts of the disk surface by the pressure roller and like the conventional cases the texture tape is fed while rotating the disk. With this operation, rough protrusions and recessions form the texture 8. On the contrary, a texture tape having a small roughness is used in the outer parts of the disk. Therefore, fine protrusions and recessions forming the texture 9 are formed in the outer parts in the same way as the way for the inner parts.

Instead of using texture tapes having different conditions each other in roughness in the inner parts and the outer parts of the disk, tapes having the same roughness may be employed. In this case, the depressing force of the pressure roller is strengthened in the inner parts and is weakened in the outer parts so that rough protrusions and recessions are formed in the inner parts and fine protrusions and recessions are formed in the outer parts.

Referring to FIG. 6 to FIG. 9, the third embodiment of the present invention is described below.

Figure 6:
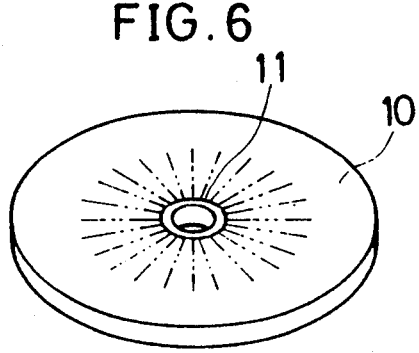

Similar to the first embodiment and the second embodiment, a magneto-optical disk of the present embodiment is configured such that a magneto-optical recording film, and a protective film are laminated on a substrate. As shown in FIG. 6, a resin layer 10 is formed on the protective film, and protrusions and recessions 11 in the shape of folds and having the maximum heights $R_{MAX}$ of 100 nm to 2500 nm are formed on the surface of the resin layer 10. Shortly, as shown by the two-dot long and two short dashes line of FIG. 6, the protrusions and recessions 11 are formed such that lines representing the tops of each folds extend radially in radial directions of the magneto-optical disk. The height of the fold decreases gradually from inner parts of the disk toward outer parts thereof. That is to say, the shapes of the physical protrusions and recessions formed on the surface of the resin layer 10 vary at each radial locations on the magneto-optical disk. As a result, since floating force given to a floating head from the magneto-optical disk being rotated based on the CAV method through an air layer becomes the same both in the inner parts and in the outer parts, the floating height of the floating head becomes constant irrespective of radial locations on the magneto-optical disk.

The following description will discuss a method for processing a disk surface in the similar way to the above.

Figure 7A:
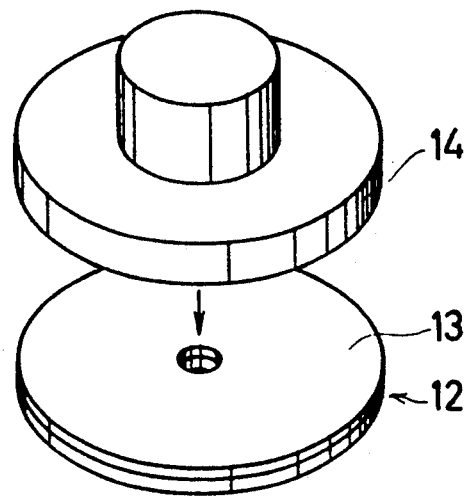
FIG. 7(a) is a schematic perspective view showing a method for forming the magneto-optical disk surface with the texture by the use of a stamper.
Figure 7B:
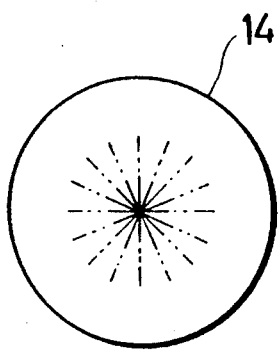
FIG. 7(b) to FIG. 7(d) are typical schematic bottom plan depictions showing the features of textures etched on the stamper, corresponding to the features of textures of a recording medium to be formed.
Figure 7C:
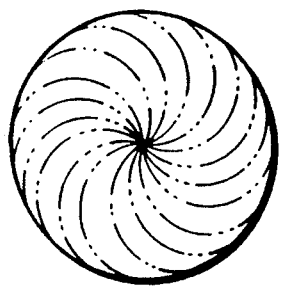
Figure 7D:
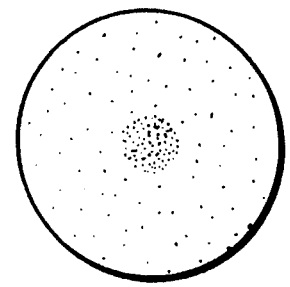

As shown in FIG. 7(a), the magneto-optical disk 12 is coated with a resin 13 made of an ultra violet (UV) hardening resin (for example, unsaturated polyester and oligoacrylate). The UV hardening resin is a kind of optical hardening resins. The resin 13 is hardened by irradiating ultra violet light thereon. A stamper 14 whose texture corresponds to the protrusions and recessions 11 in the shape of folds is pressed onto the hardened resin 13. The bottom surface of the stamper 14 is textured with desired features, for example the one shown in FIG. 7(b), by chemical etching, precision machine processing or other process. The features of a texture to be etched on the stamper 14 may correspond to the features of the textures discussed in the first embodiment and the second embodiment, shown in FIG. 7(c) and FIG. 7(d). In such cases, a magneto-optical disk having the texture features discussed in the first embodiment or the second embodiment can be formed.

Next, a method for processing the surface of a magneto-optical recording medium which copes with mass production is described below.

Figure 8:
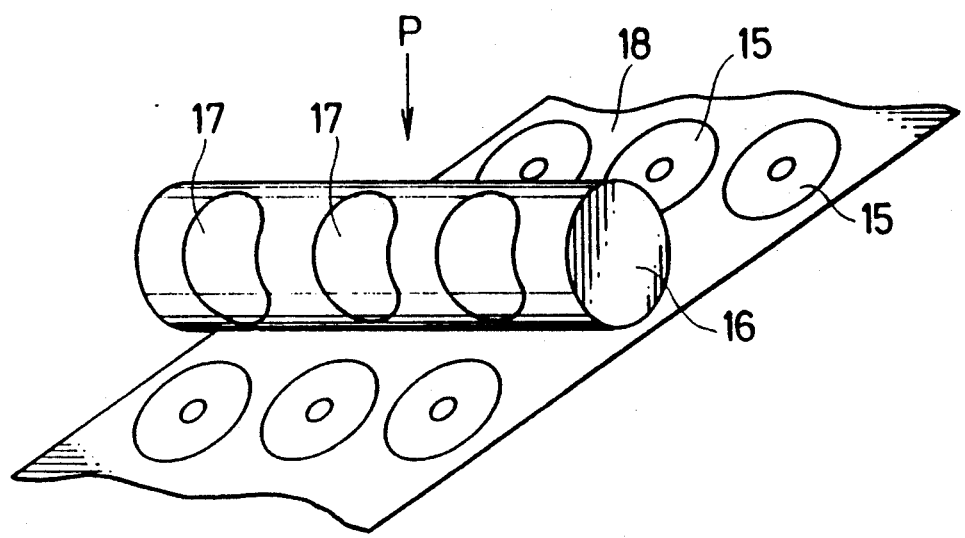
Figure 9:
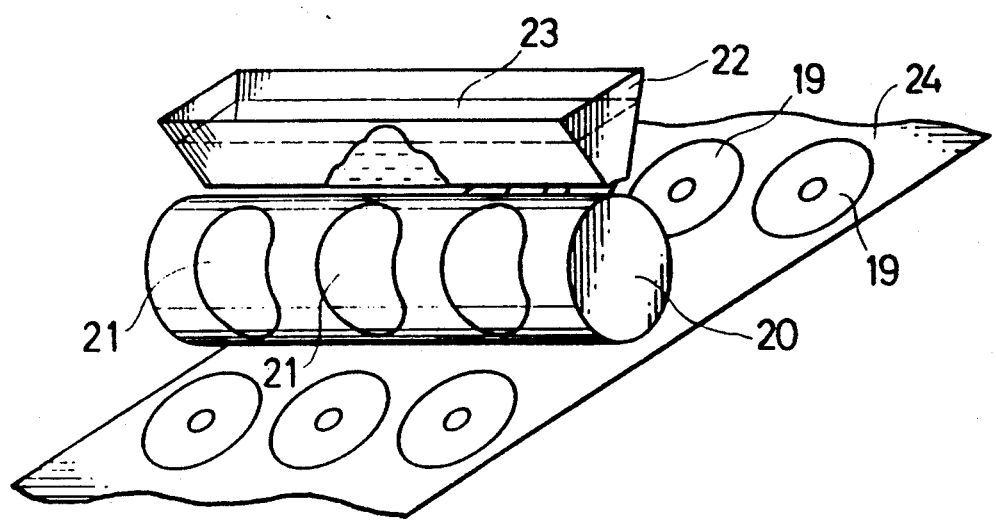

As shown in FIG. 8, magneto-optical disks 15 are produced on a production board 18 by leaving predetermined spaces longitudinally and transversely between the disks. The magneto-optical disks 15 have already been coated with a resin (not shown). A roller 16 comprises stampers 17 for giving texture. The stampers 17 are positioned so as to correspond to the respective magneto-optical disks 15. When forming the disk surfaces with the texture, the roller 16 is rotated and the stampers 17 for giving texture are pressed onto the magneto-optical disks 15 on the production board 18 with constant pressure P, so that the magneto-optical disks 15 having a texture of desired features can be produced.

Another method for processing the surface of a magneto-optical recording medium which copes with mass production is described below.

Like the above case, magneto-optical disks 19 are formed on a production board 24, and a roller 20 comprises stampers 21 on the surface thereof. A pot 22 containing a thermoplastic resin 23 is disposed above the roller 20. The resin 23 is supplied to the roller 20 from the bottom section of the pot 22. The magneto-optical disks 19 are not coated with a resin for giving texture. When forming a texture, the resin 23 is supplied to each the stampers 21 from the bottom section of the pot 22 at the time the roller 20 rolls on the production board 24. The resin 23 whereon the features of the texture of the stampers 21 are transferred is applied to the magneto-optical disks 19 with the rolling of the roller 20. In this case, the stampers 21 and the pot 22 are heated. Since the resin 23 is a thermoplastic resin, the resin 23 attached on the magneto-optical disks 19 are hardened by being cooled. Consequently, the surfaces of the magneto-optical disks 19 are textured with desired features.

As described above, a magneto-optical recording medium of the present invention is basically configured such that the shapes of fine and physical protrusions and recessions formed on the surface of the medium vary at each radial locations on the magneto-optical recording medium.

For this reason, in case the magneto-optical recording medium is rotated in the CAV method, the relative velocity between the floating head and the magneto-optical recording medium becomes higher toward the outer parts. However, the floating pressure in the outer parts equals the floating pressure in the inner parts due to the shapes of protrusions and recessions formed on the surface of the recording medium. Therefore, the floating height of the floating head is substantially constant irrespective of radial locations on the recording medium. Consequently, since the intensity of the magnetic field applied to the magneto-optical recording medium from the floating head becomes substantially constant, information is recorded under substantially constant conditions irrespective of radial locations, thereby permitting the accuracy of the recording to improve.

A method for processing the surface of a magneto-optical recording medium relating to the present invention is characterized in that pressure means is moved so that protrusions and recessions are formed in a direction which crosses the rotating direction of the recording medium at substantially right angle in inner parts of the recording medium and is in parallel with the rotating direction in outer parts thereof.

Another method for processing the surface of a magneto-optical recording medium relating to the present invention is characterized in that a tape whose roughness is large is used in inner parts of the recording medium while a tape whose roughness is small is used in outer parts thereof.

Another method for processing the surface of a magneto-optical recording medium relating to the present invention is characterized in that the depressing force of pressure means is strong in inner parts of the recording medium while it is weak in outer parts thereof.

Another method for processing the surface of a magneto-optical recording medium relating to the present invention is characterized in that protrusions and recessions of desired shapes are formed by using a stamper whereon the desired shapes are etched beforehand and by copying the shapes onto the surface of the magneto-optical recording medium.

Accordingly, magneto-optical recording media produced based on the above methods are characterized in that the shapes of fine and physical protrusions and recessions formed on the surface of the magneto-optical recording media vary at each radial locations on the magneto-optical recording media. Therefore, the respective methods are capable of producing magneto-optical recording media on which information is recorded under substantially constant conditions irrespective of the position of a floating head in a radial direction of the recording media.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A magneto-optical recording medium comprising a disk substrate,
a magneto-optical recording layer formed on said substrate, and
a protective layer formed on said recording layer, wherein physical protrusions and recessions, form a texture on a surface of said protective layer and the shapes of the physical protrusions and recessions vary at each radial location on the magneto-optical medium, whereby a floating force given to a floating type magnetic head from the magneto-optical recording medium through an air layer becomes substantially the same both in areas near the center of the magneto-optical recording medium and in areas near the periphery thereof,
wherein the protrusions and recessions forming the texture on the protective layer surface are aligned in a direction which crosses the rotating direction of the recording medium at a substantially right angle in areas near the center of the recording medium and is substantially parallel with the rotating direction in areas near the periphery thereof.

2. A magneto-optical recording medium comprising:
a disk substrate,
a magneto-optical recording layer formed on said substrate, and
a protective layer formed on said recording layer, wherein physical protrusions and recessions form a texture on a surface of said protective layer and the shapes of the physical protrusions and recessions vary at each radial location on the magneto-optical medium, whereby a floating force given to a floating type magnetic head from the magneto-optical recording medium through an air layer becomes substantially the same both in areas near the center of the magneto-optical recording medium and in areas near the periphery thereof,
wherein the respective lengths of the protrusions and recessions are longer than their respective widths and the average orientation of the respective physical protrusions and recessions with respect to their lengths vary successively so that the average orientation crosses the rotating direction of the recording medium at a substantially right angle at areas near the center of the recording medium and the average orientation is substantially in parallel with the rotating direction at areas near the periphery thereof.

3. A magneto-optical recording medium comprising:
a disk substrate,
a magneto-optical recording layer formed on said substrate, and
a protective layer formed on said recording layer, wherein physical protrusions and recessions form a texture on a surface of said protective layer and the shapes of the physical protrusions and recessions vary at each radial location on the magneto-optical medium, whereby a floating force given to a floating type magnetic head from the magneto-optical recording medium through an air layer becomes substantially the same both in areas near the center of the magneto-optical recording medium and in areas near the periphery thereof,
wherein a line of the physical protrusions and recessions form folds, and said folds extend radially from the center of the recording medium, the maximum height $R_{MAX}$ of the folds is 100 nm to 250 nm, and the height decreases from the center of the recording medium toward the periphery thereof.

4. A magneto-optical recording medium comprising:
a disk substrate,
a magneto-optical recording layer formed on said substrate, and
a protective layer formed on said recording layer, wherein physical protrusions and recessions form a texture on a surface of said protective layer and the physical protrusions and recessions are disposed along hypothetical curves which initially extend radially in all directions from the central part of the magneto-optical recording medium and bend gradually until they coincide with a circle corresponding to the outer periphery of the recording medium.

* * * * *

UNITED STATES PATENT AND TRADEMARK OFFICE
CERTIFICATE OF CORRECTION

PATENT NO. : 5,328,740

DATED : July 12, 1994

INVENTOR(S) : Nakayama, et al.

It is certified that error appears in the above-indentified patent and that said Letters Patent is hereby corrected as shown below:

Column 10, line 59, replace "250 nm" with --2500 nm--.

Signed and Sealed this

Twenty-third Day of April, 1996

Attest:

BRUCE LEHMAN

*Attesting Officer*     *Commissioner of Patents and Trademarks*